Patented Dec. 31, 1940

2,227,312

UNITED STATES PATENT OFFICE 2,227,312

METHOD OF MANUFACTURING AN IMPREGNATED PRODUCT

Paul Mahler, New York, N. Y.

No Drawing. Application May 17, 1938, Serial No. 208,485

1 Claim. (Cl. 91—70)

The invention relates to an impregnated porous material, and to a method for its production. More particularly, it pertains to an impregnated sandstone, and includes correlated improvements and discoveries whereby such a sandstone having enhanced qualities may be produced.

It is an object of the invention to provide a method whereby a porous material, e. g., sandstone, artificial stone and the like may be impregnated with gilsonite.

Another object of the invention is to provide a procedure whereby an impregnation of sandstone with gilsonite is effected with the obtainment of a novel material characterized by distinctive chemical resistivity and structural or mechanical strength.

A further object of the invention is to provide a method in accordance with which sandstone may be impregnated with a plasticized gilsonite in a manner which may be readily, effectively and economically carried out commercially.

A still further object of the invention is to provide as an article of manufacture a porous material, for example, a sandstone impregnated with gilsonite, and having marked inactivity chemically and strength structurally.

A more particular object of the invention is to provide a sandstone of definite structure impregnated with gilsonite.

Other objects of the invention will in part be obvious and will in part appear hereinafter.

The invention accordingly comprises the several steps and the relation of one or more of such steps with respect to each of the others, and the composition possessing the features, properties, and the relation of constituents, which are exemplified in the following detailed disclosure, and the scope of the invention will be indicated in the claim.

In the practice of the invention a chemically resistant and structurally strong impregnated porous material may be obtained by treating a porous material having an apparent density of from about 2.1 to 2.4, e. g., a sandstone, an artificial stone and the like, with gilsonite in molten condition. More especially, the impregnation of the porous material may be effected by heating such material and the gilsonite to substantially the same temperature, and then while at this temperature contacting the material with the gilsonite.

In order to facilitate the contacting or impregnation, the material, while being subjected to the influence of gilsonite, may be subjected to pressure. Further, the material, prior to treatment with gilsonite, may be heated for a time sufficient to remove substantially all of the moisture present, and the impregnation might be accomplished under the influence of a vacuum. Moreover, vacuum in conjunction with pressure might be used during the impregnation but the most satisfactory results from a practical standpoint have been obtained when utilization is made of pressure alone. The adherency of the gilsonite and its employment as an impregnating medium are augmented by the addition to the gilsonite of a plasticizer. The plasticizer is a substance which is compatible with the gilsonite, does not undergo decomposition at the temperature at which the gilsonite bath is heated, and may be, for example, an asphalt, a tar, a high boiling point oil, or similar substances. The extent to which the plasticizer is used will depend upon the qualities which it is desired to impart to the gilsonite. Especially, the amount may be from 20% to 40%, and preferably is about 25% based upon the weight of the gilsonite.

I have found that gilsonite, upon heating, exhibits rather unique qualities. When heated over a low flame the gilsonite first melts and there is not any appearance of bubbles or gas evolution until the temperature reaches about 140° C. From this point on there is a slight fuming but not a copious evolution of gas. At 240° C. the evolution is markedly increased until the mass as a whole is substantially doubled in volume. This increase in volume occurs over the range 240–280° C. After 280° C. the mass returned to its original volume with continued evolution of gas, and remained at this volume until about 350° C. when it again increased.

In view of this unique property it was found desirable to effect impregnation of the porous material at a temperature of 220° to 240° C. While impregnations may take place at temperatures lower and higher, I have found that the products obtained do not possess all of the advantageous qualities as do those produced within the aforesaid temperature range. A pressure of 20 to 100 lbs. per square inch may be applied during the impregnation, and it is desirable also to permit the porous material to remain in the gilsonite bath for a short time prior to applying pressure. Moreover, when utilizing pressure, either with a virgin or a reused charge, there was freedom from frothing, and also from various interruptions which attended the working under a vacuum. The grain size of the porous material is of marked import for the production of an impregnated product which is distinctly inert chemically and strong mechanically and which is capable of being commercially adapted by cutting and shaping operations. Unless the grain size, which may otherwise be spoken of as apparent density, lies within a given range, the products may not be readily cut, shaped and drilled, and the other desired qualities are markedly lacking. A suitable body is one having an apparent density of from 2.1 to 2.4 and a preferred density of about 2.28. For example, it was found that impregnation of a sandstone having an apparent density of 2.28 occasioned an increase in the density to 2.36. This stone required about 4% of the gilsonite for impregnation, and it possessed the chemical inertness and structural strength required for fabrication into different types of equipment. Furthermore, the cutting and shaping of such a stone could be carried out with facility, and consequently without an unduly large cost.

The impregnation may be carried out by forming the porous material, as a sandstone, artificial stone, and the like into slabs of suitable size, and placing them in a drying chamber which may be heated to a suitable temperature, e. g., 220° to 240° C., more particularly 220° to 230° C. This heating may be accomplished by conditioned air or other gaseoform fluid, or indirectly by passing a hot fluid, as superheated steam, through suitable flues positioned in or about the chamber. The heating, for particularly advantageous results, should be continued until the moisture has been substantially removed from the porous material.

A quantity of gilsonite, which may be and preferably is plasticized, may at the same time be heated to a like temperature, i. e., 220° to 240° C., and then the heated porous material, as sandstone, may be contacted with the molten gilsonite by placing the sandstone in a vessel or tank and introducing the gilsonite. Subsequent to placing the sandstone in the contacting tank the pressure therein may be reduced to a suitable extent, and the gilsonite introduced. Otherwise, the gilsonite may be immediately placed into the contacting vessel and, after a short period, pressure of from 20 to 100 lbs. per square inch may be applied. The temperature of the vessel containing the molten gilsonite and that in which the contacting or impregnation takes place may be heated in a suitable manner, as by means of the circulation of hot oil through tubes placed about or within the vessels. Moreover, the temperature of the contacting vessel is maintained, and this may be indicated by use of a pyrometer. The porous material is permitted to remain in contact with the gilsonite under controlled temperature and pressure conditions until the desired impregnation has been obtained.

This time will depend upon the size of the material undergoing impregnation, and may be readily determined by suitable trial. When the impregnation is complete, the gilsonite is withdrawn therefrom and returned to the vessel in which it was heated. Following this the impregnated material is taken out and the gilsonite adhering to the surfaces is suitably removed. Thereafter the material is ready for manufacture into various forms for commercial and industrial use.

As illustrative of the properties of a porous material impregnated with gilsonite, which may be plasticized with an asphalt, mention may be made of the results of a number of tests to which an impregnated slab of tripoli was subjected. The tripoli was thoroughly impregnated with gilsonite and a weighed portion thereof was treated successively in the following manners: boiled in water for 30 minutes, and then successively in 5:20 concentrated sulfuric acid-water mixture for 10 minutes; a 10:20 mixture for 15 minutes; a 15:20 mixture for 5 minutes; a 20:20 mixture for 5 minutes; a 25:20 mixture for 5 minutes; 20% hydrochloric acid for 30 minutes; 10% nitric acid for 30 minutes; 20:20 sulfuric acid-water mixture for 5 minutes; 10% sodium hydroxide for 30 minutes; 10% sodium chloride for 10 minutes; water for 20 minutes; and a 20:20 sulfuric acid-water mixture for 10 minutes. The original weight of the fragment was 3.62 grams. At the end of the thirteen treatments its weight was 3.54 grams, a loss of only 2.2 percent. The hardness of the fragment was unimpaired. These results indicate that gilsonite impregnated material is strongly resistant to a variety of reagents which are known for their corrosive and disintegrating action, even when these materials were utilized in high concentrations and at the boiling point of the solutions.

Other series of tests conducted upon impregnated materials, both at room temperatures and higher temperatures, illustrate the same qualities as given above in detail for an impregnated tripoli. The herein described procedure for impregnation of porous material having an apparent density of from 2.1 to 2.4 is characterized by the following features. While impregnation under vacuum may be carried out, it nevertheless presents difficulties from which impregnation under pressure is free, hence use of pressure is preferred; the lower the temperature of the contacting bath consistent with satisfactory impregnation, the more satisfactory the results obtained; the more uniform the temperature of the bath throughout, the more uniform will be the impregnation; in the event that the porous material, as a sandstone, is dressed prior to impregnation, a method should be used which will avoid a blocking of the surface pores with dust; the material to be impregnated is desirably preheated before being placed in the contacting vessel, and the temperature should be equal to or slightly greater than that of the contacting bath, and in view of the relatively low heat conductivity of gilsonite, and its unique behavior when subjected to heat, it is desirable to use a form of indirect heating which may be easily controlled inasmuch as thereby local overheating, excessive formation of free carbon and undue frothing of the melt are avoided.

The impregnated product obtained by the foregoing procedure is suitable for construction purposes, as in the fabrication of industrial chemical equipment, and the like. More particularly, it is well adapted for the construction of vats and tanks in which a great variety of chemical reactions may take place. Such an impregnated product withstands the action of strong hot acid or salt solutions, and also moderately strong cold alkalies indefinitely. Further, tanks and other equipment made from such a product will not evidence any appreciable wear, as pitting, spalling, sweating, or other undesirable effects. Furthermore, the strength of the impregnated material shows a modulus of rupture of from 1200 to 1600 lbs. per square inch per inch thickness, which is substantially from three to four times that of the original material. This increase in rupture strength renders the material well adapted for the construction of large size equipment or structures.

This application is in part a continuation of my co-pending application Serial No. 116,437, filed December 17, 1936.

Since certain changes in carrying out the above process and certain modifications in the composition which embody the invention may be made without departing from its scope, it is intended that all matter contained in the above description shall be interpreted as illustrative and not in limiting sense.

It is also to be undertsood that the following claim is intended to cover all of the generic and specific features of the invention herein described, and all statements of the scope of the invention which, as a matter of language, might be said to fall therebetween.

Having described my invention, what I claim as new and desire to secure by Letters Patent is:

A method for the production of a chemically resistant, machineable, impregnated sandstone which comprises heating a porous sandstone having an apparent density of 2.1 to 2.4 to a temperature of 220° to 240° C., applying to the sandstone a molten bath at 220° to 240° C. of gilsonite plasticized with from 20 to 40% asphalt having the same chemically resisting properties as the gilsonite, subjecting the sandstone and bath to a pressure of 20 to 100 lbs./sq. in. while in heated condition and for a period sufficient to effect a substantial impregnation, and thereafter removing objectionable, adhering plasticized gilsonite from the surface of the impregnated sandstone.

PAUL MAHLER.